INVENTOR.
GEORGE USTIN
BY
ATTORNEY

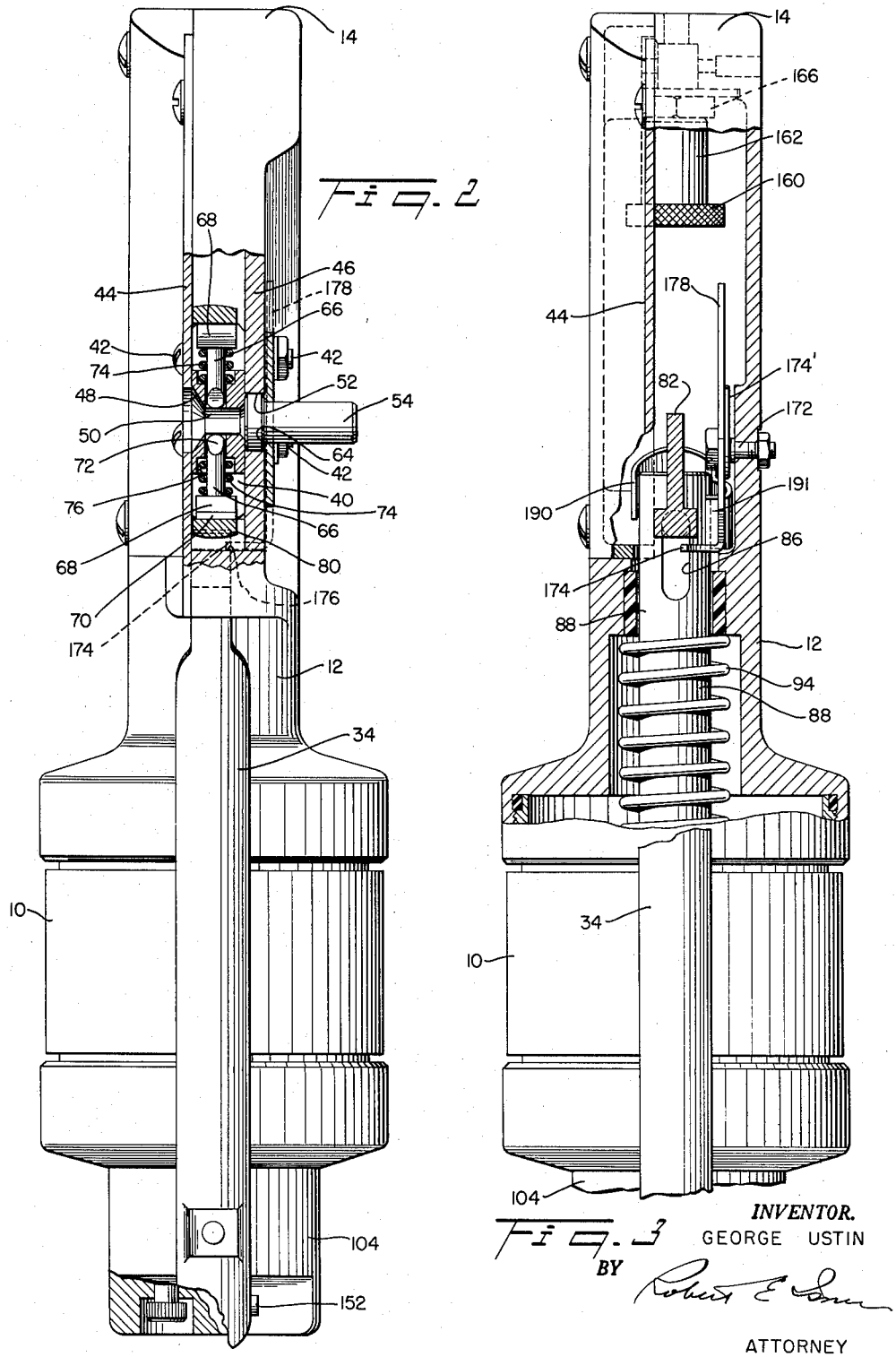

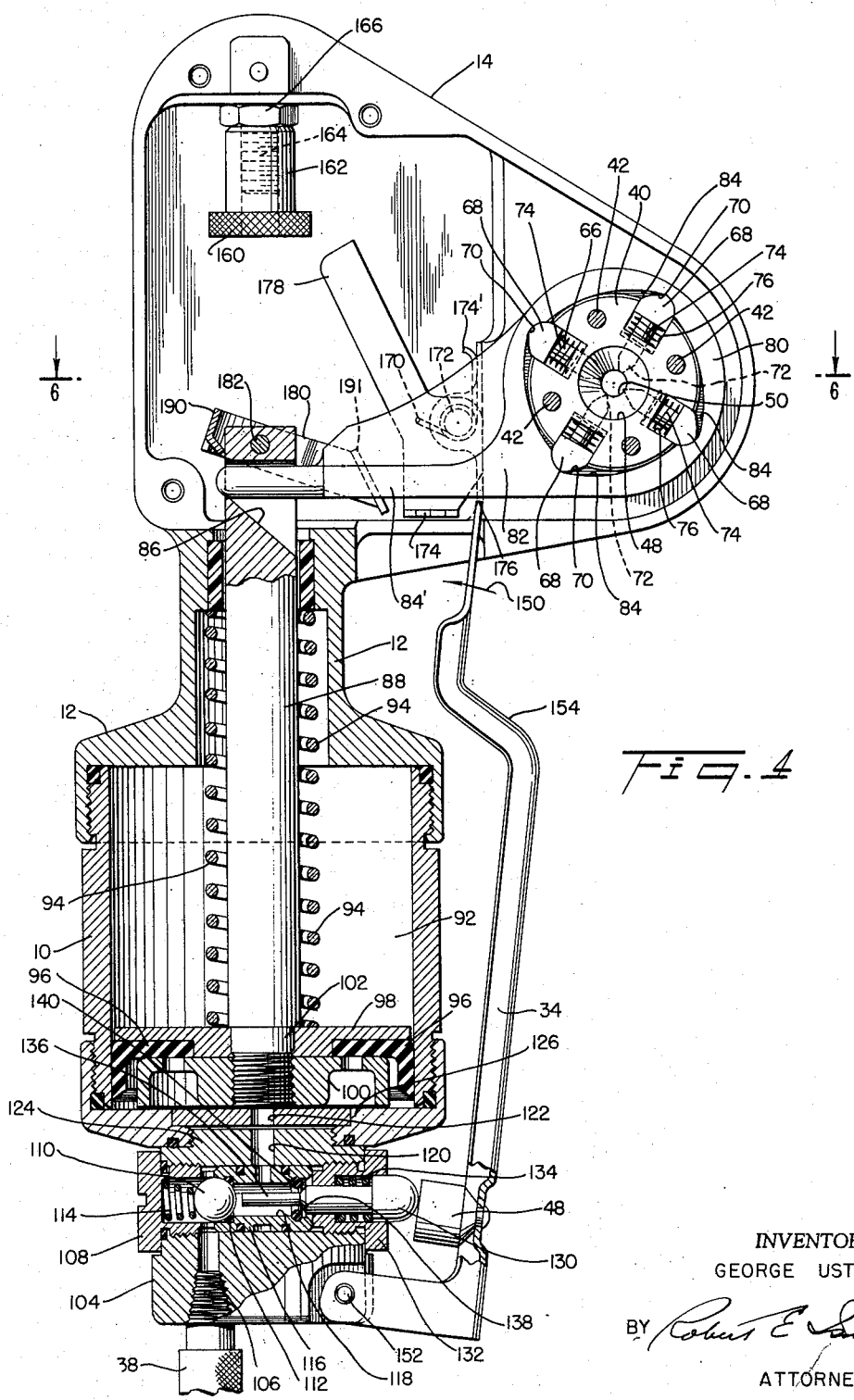

April 23, 1963 G. USTIN 3,086,574
PNEUMATIC TOOL
Filed Jan. 12, 1960 5 Sheets-Sheet 5
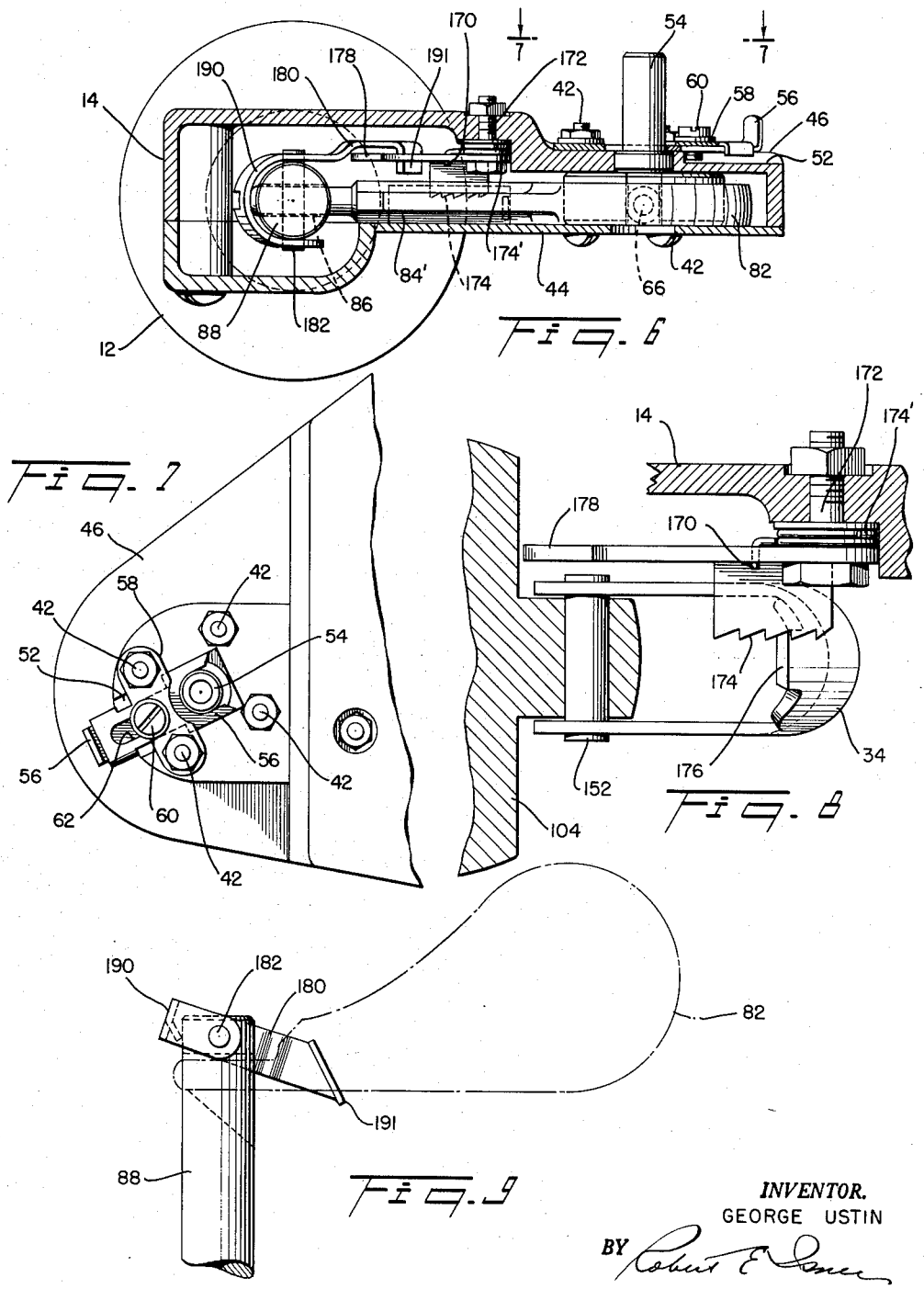
INVENTOR.
GEORGE USTIN
BY
ATTORNEY United States Patent Office 3,086,574
Patented Apr. 23, 1963

3,086,574
PNEUMATIC TOOL
George Ustin, Verona, N.J., assignor to Buchanan Electrical Products Corporation, Hillside N.J., a corporation of New Jersey
Filed Jan. 12, 1960, Ser. No. 2,065
4 Claims. (Cl. 153—1)

This invention relates to power operated crimping tools and particularly to an improved construction for remotely operable power operated crimping tools adapted for symmetrical crimping of electrical contacts, terminals and similar electrical assemblies.

Manually operable crimping tools incorporating a bored dieholder rigidly mounted in a carrier member, a plurality of radially disposed crimping dies reciprocably mounted therein and an associated operating member having a cammed die member actuating surface mounted for rotative displacement relative to the dieholder and carrier member are well known in the art. Useful as these manually operated tools are, however, they possess certain inherent disadvantages when they are utilized in mass production fabrication operations. One such disadvantage is unavoidable operator fatigue attendant the repeated clenching operations characteristic of the manually operated tools. Another disadvantage is the impracticability of fixedly locating a conventionally constructed hand operated or hand manipulated tool and the consequent utilization of undue amounts of time required for individual workpiece insertion, deformation and removal therefrom. Still another disadvantage of the conventionally constructed manually operable tools is the impracticability of fixedly mounting or otherwise arranging the same in such manner as to permit remote operation thereof, as by an operator's foot, so as to free both of the operator's hands for workpiece insertion and removal.

This invention may be briefly described as an improved construction for power operated crimping tools that may be selectively utilized as a portable power tool or fixedly located in any one of a variety of operative positions and remotely controlled by an operator to facilitate use thereof in mass production fabrication operations. The disclosed tool construction broadly includes a crimping mechanism of the basic type mentioned above wherein the necessary rotative displacement of the operating member relative to the dieholder is power actuated, associated means for selectively controlling the depth of crimp introducible into a workpiece in accordance with the selective dictates of the workpiece and an associated full cycling mechanism to insure that once a crimping operation has been initiated upon a workpiece, a full operating cycle must be completed before initiation of a succeeding operation.

Among the advantages attendant the herein described invention is the provision of a lightweight and readily portable power operated crimping tool that may be selectively mounted and remotely operated in any one of a variety of positions to facilitate utilization thereof in mass production fabrication operations. Another advantage of the herein described construction is the permitted realization of greatly increased production rates and a marked decrease in operator fatigue.

Still another advantage attendant the instant construction is the permitted utilization of the basic tool to effect varying types of crimping operations upon varying types of workpieces and the assurance that once a crimping operation has been initiated upon a workpiece, a full operating cycle must be completed before initiation of operation upon a subsequent workpiece. A further advantage attendant the instant construction is the provision of uniform crimping operations upon each workpiece and consequent uniformity of finished product.

The primary object of this invention is the provision of an improved construction for power operated crimping tools.

Another object of this invention is the provision of a readily portable power operated crimping tool that may be selectively mounted and remotely operated in any one of a variety of positions.

Another object of this invention is the provision of an improved full cycling mechanism construction for power operated crimping tools to assure that once a crimping operation has been initiated upon a workpiece, a full operating cycle must be completed before initiation of operation on a succeeding workpiece.

Another object of this invention is the provision of a crimping tool construction that markedly reduces operator fatigue and permits of greatly increased production rates.

Still another object of this invention is the provision of a lightweight and inexpensive power operated crimping tool that is particularly adapted for mass production fabrication operations.

The above and other objects and advantages of the invention will appear from the following specification and claims and from the appended drawings which illustrate the principles of the invention and a presently preferred embodiment of a power operated crimping tool construction incorporating those principles.

Referring to the drawings:

FIGURE 2 is a top view, partially in section, of the basic tool illustrated in FIGURE 1;

FIGURE 3 is a bottom view, partially in section, of the tool illustrated in FIGURE 1;

FIGURE 4 is a sectional view taken in a vertical plane of the basic tool illustrated in FIGURE 1, illustrating the disposition of the component elements at the start of an operational cycle;

FIGURE 6 is a sectional view as taken on the line 6—6 of FIGURE 4;

FIGURE 7 is an elevational view as taken on the line 7—7 of FIGURE 6;

FIGURE 8 is an enlarged view of certain of the component elements associated with the full cycling mechanism;

FIGURE 9 is an enlarged view of a portion of the trigger assembly.

Figure 1:
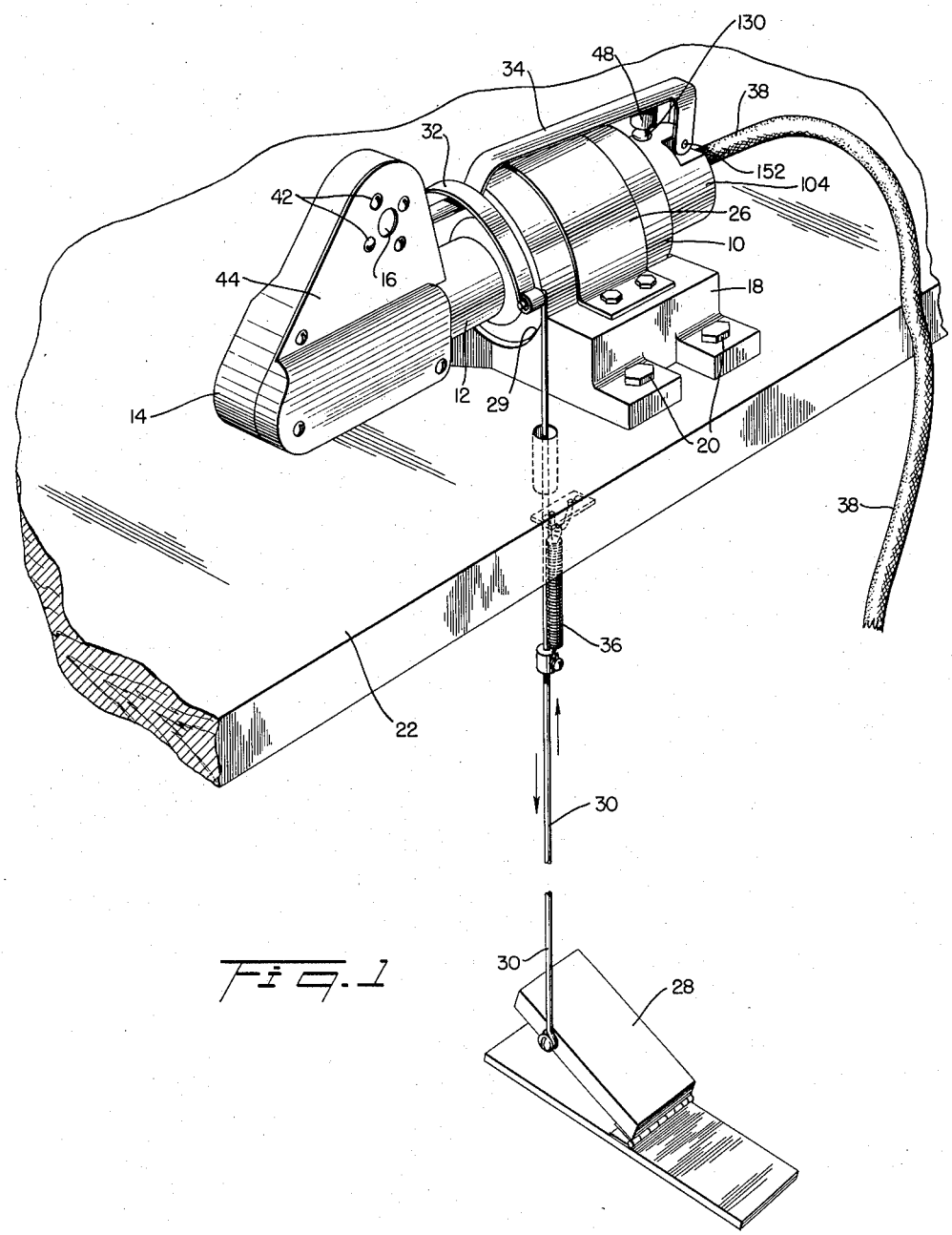
FIGURE 1 is a schematic oblique view of a presently preferred construction for a power operated crimping tool, incorporating the principles of this invention and illustratively bench mounted for remote operational control as would be desirable for utilization of the same in mass production fabrication operations.

Referring to the drawings and initially to FIGURE 1 thereof, the power operated crimping tool forming the subject matter of the herein disclosed invention generally includes a substantially barrel-shaped power cylinder housing portion 10, an adjacent piston rod containing neck portion 12 of appreciably reduced external diameter and a terminally disposed crimping mechanism housing assembly generally designated 14 that is provided with a suitable aperture 16 definitive of a workpiece receiving and positioning bore. As shown, the tool is illustratively bench mounted for remote operator control. Such bench mounting is facilitated, for example, by utilization of a selectively positionable mounting block 18 secured by a plurality of bolts 20 to a horizontally disposed work bench 22. The mounting block 18 is preferably complementally shaped to provide a positioning cradle 24 for the barrel shaped housing portion 10 and such is securely retained therein by an overlying shaped retaining strap 26. Remote operation of the illustrated unit may be conveniently effected by a pivotally mounted foot treadle 28 connected to one end of a vertically disposed connecting rod 30. The other end of the connecting rod 30 is connected to a pivotally mounted semi-circular strap member 32 disposed in overlying engagement with and adjacent the free end of a pivotally mounted valve operator or control lever 34. The connecting rod 32 is normally biased in an upward direction by a biasing spring assembly generally designated 36 and, as illustrated, is arranged to be displaced in a downward direction by the manipulation of the foot treadle 28 by the tool operator. The downward displacement of the pivotally mounted treadle 28 effects a downward displacement of the connecting rod 30, a concomitant pivotal displacement of the strap 32 and downward displacement of the free end of the pivotally mounted valve operator 34. As will be later described and explained in detail, the downward displacement of the free end of the pivotally mounted valve operator 34 actuates a valve assembly to effect the admission of impelling fluid from the supply pipe 38 into a power cylinder to cause piston rod advance and consequent operation of the crimping die assembly.

Turning now to the remaining FIGURES of the draw-
Turning now to the remaining figures of the drawings which show the constructional details of a presently preferred embodiment of a power operated crimping tool incorporating the principles of this invention, there is provided a generally disc shaped dieholder or plunger body 40 secured, as by a plurality of bolts 42, to the sidewall cover plates 44 and 46 of the crimping mechanism housing assembly 16. As mentioned earlier, the crimping mechanism, per se, is of conventional construction and is of the type described in my copending application Serial No. 772,878, filed November 10, 1958. As best shown in FIGURE 2, the dieholder 40 is provided with a conically shaped workpiece entry aperture 48 inwardly terminating in an axially disposed workpiece receiving bore 50 that is disposed in axial alignment with the aperture 16 in the sidewall cover plate 44. The other sidewall cover plate 46 is provided with a suitable aperture 52 disposed in axial alignment with the bore 50 sized to receive and position a locator member 54 of the type described in my aforesaid copending application. Positional maintenance of the locator member 54 in the locator receiving bore 52 is facilitated by a manually operable retainer assembly mounted on the outer surface of the side wall cover plate 46. As best shown in FIGURES 6 and 7, the retainer assembly includes a manually displaceable forked slide member 56 disposed beneath a bridging retainer 58 secured to the surface of the sidewall portion 46 by a pair of bolts 42 utilized to secure the dieholder 40. The displacement of the forked slide member 56 is guided and limited by means of a bolt 60 mounted thereon and having its shaft disposed in a slot 62 in the bridging retainer 58. The forked end portion of the slide 56 is adapted to partially encircle and be disposed in overlaying engagement with the flanged periphery 64 of the locator member 54 and thereby position and retain said element in the aperture 52.

The dieholder 40 is provided with a plurality (specifically four in the illustrated embodiment) of radially disposed die member receiving bores each having a crimp-die or plunger member 66 reciprocably mounted therein. Each of the crimping die members 66 includes an elongate cylindrically shaped body portion sized to be reciprocably contained within the receiving bores, an enlarged head portion 68 incorporating an exposed cam surface 70, and a dependent workpiece engaging crimping tooth 72.

As illustrated, a crimping die or plunger member 66 is mounted in each of the radially disposed die member receiving bores and each is biased radially outwardly by a suitable biasing spring 74 one end of which is disposed within an enlarged peripheral recess 76 in the die holder body 40 and the other end of which is disposed beneath the enlarged head portion 68 of the crimping die member.

Figure 5:
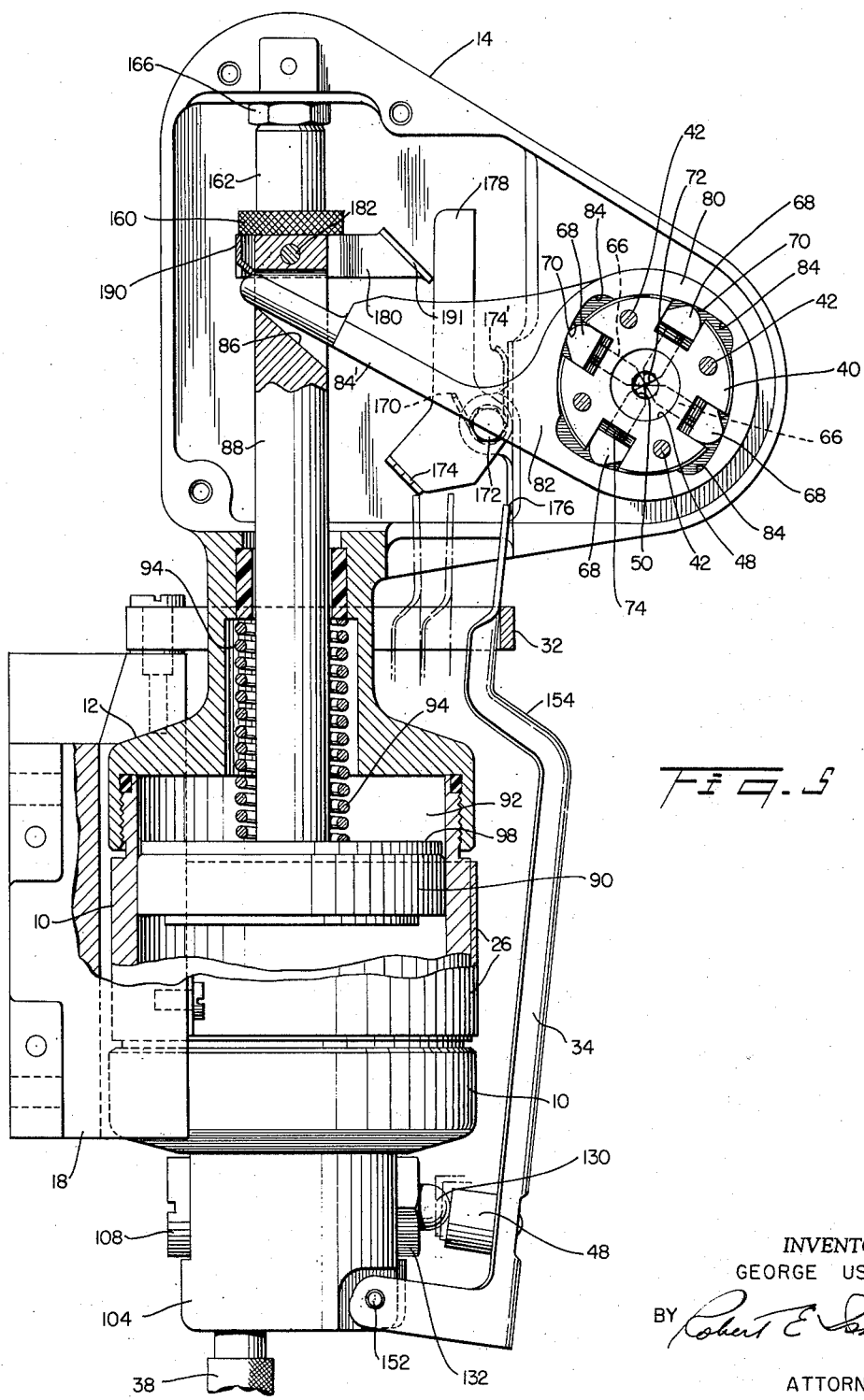
FIGURE 5 is a side elevational view, partly in section, showing the disposition of certain of the component elements at a different point in the cycle of operations from that illustrated in FIGURE 4.

Surrounding the dieholder 40 and the plurality of crimping die members 66 reciprocably mounted therein and rotatably displaceable relative thereto is the generally annularly shaped cam surface containing portion 80 of an operating member generally designated 82. As best shown in FIGURES 4 and 5, the cam surface containing portion 80 of the operating member 82 is provided with a plurality of cam surfaces 84 engaging the outwardly biased cam surfaced head portions 70 of the individual crimping die members 66. The cam surfaces 84 on the operating member 82 and the cam surfaced head portions 70 of the crimping die members 66 are so designed and arranged that rotative displacement of the operating member 82 relative to the dieholder 40 results, for one direction of rotation, e.g., clockwise as viewed in FIGURES 4 and 5, in a simultaneous inward displacement of the individual die members 66 against the action of the individual biasing springs 74, and convergence of the dependent crimping teeth 72 thereof with the longitudinal axis of the workpiece receiving bore 50 and, for the other direction of rotation, e.g., counterclockwise, in a permitted outward displacement of the die members 66 by said biasing springs 74.

The operating member 82 is provided with an extension leg portion 84 sized to have the terminal end thereof disposed within a slot 86 adjacent the exposed end of reciprocable piston rod member 88. The other end of the piston rod 88 is connected to a piston generally designated 90 disposed in a cylinder 92 and normally biased in retracted position by a spring member 94. As best shown in FIGURE 4, the piston 90 is constituted by an annular piston cup 96 disposed intermediate a back up plate 98 and an adapter member 100 which is provided with a threaded bore 102 for piston rod securement thereto. Secured to the end of the cylinder housing 10 is a valve body 104 having an impelling fluid entry post 106 connected to the conduit 38. The entry port 106 is in fluid communication with a valve assembly formed of an intake plug 108 surrounding a ball 110 normally biased into sealing engagement with a sealing ring 112 mounted on an intake-exhaust spool 116 by a spring 114. The intake-exhaust spool 116 is provided with a bore 118 disposed in fluid communication with the interior of the cylinder 92 by means of bores 120 and 122 disposed in the clamp plates 124 and 126 respectively.

The described valve assembly also includes a valve plunger 130 mounted in an exhaust plug 132 and normally biased out of engagement with the ball 110 by a spring 134. The valve plunger 130 is provided with an extension 136 sized to engage and displace the ball 110 from sealing engagement with the sealing ring 112 and a sloping sealing surface or shoulder 138 sized to engage, in sealing relation, the sealing ring 140 upon plunger displacement inwardly of the bore 118.

Inward displacement of the valve plunger 130 against the action of the biasing spring 134 is effected by means of a button member 148 mounted on the control lever or valve operator 34 pivotally mounted on the valve body 104 at 152. As shown in FIGURES 4 and 5, the valve operator or control lever 34 is sized to overlie the surface of the barrel shaped cylinder housing 10 and is biased out of abutting engagement therewith by the biasing spring 134. The free end of the valve operator 34 is provided with an inwardly bent terminal portion 154 deformed to generally conform to the surface configuration of the housing portions 10 and 12.

As will be apparent to those skilled in the art, rotative displacement of the valve operator 34 about its pivotal mounting 152 will effect advance of the button 148 and inward displacement of the plunger 130. The inward displacement of the plunger 130 will result in a lifting of the ball 110 from the sealing surface 112 and in concomitant disposition of the sealing surface 138 in sealing engagement with the sealing ring 140. The above described upward displacement of the ball 110 permits the impelling fluid, suitably compressed air, to flow from the conduit 38 into the bore 118 and from thence into the cylinder 92 through the bores 120 and 122. The admission of the impelling fluid into the cylinder 92 effects displacement of the piston 98 in a direction away from the bore 122 against the action of the biasing spring 94 and in concomitant lineal advance of the piston rod 88. The lineal advance of the piston rod 88 results, due to disposition of the terminal end portion of the operating member 82 in the slot 86, in a concomitant rotative displacement of the operating member 82 and in conventional converging advance of the crimping dies 66 toward the axis of the workpiece receiving bore 50.

As is conventional with the basic type of crimping mechanism illustrated, the amount of crimping die advance is directly responsive to and is controlled by the amount of rotative displacement of the operating member 82 relative to the dieholder 40. In the instant embodiment, the amount of rotative displacement of the operating member 82 is, in turn, directly responsive to and is controlled by the amount of lineal advance of the piston rod 88. In order to control the amount of lineal advance of the piston rod 88 and hence to control the amount of crimping die advance there is provided an adjustable piston stop assembly positioned in the path of the lineal advance thereof. As illustrated, there is provided a piston rod engaging stop surface in the form of an enlarged plane surfaced knurled knob 160 terminally mounted at the end of the sleeve 162 threadedly mounted on an extending threaded stud as indicated by the dotted lines 164. An associated locking nut 166 is provided to lock the sleeve in any desired position. In the illustrated construction, the sleeve 162 may be positioned relative to the path of lineal advance of the piston rod 88 by manual rotation thereof in accordance with the selective dictates of a workpiece and locked in such position by the subsequent manual rotation of the locking nut 166. Subsequent replacement of the removable cover plate 44 effectively renders such setting substantially tamper-proof to undesired adjustment as might be effected by the operator or other unauthorized personnel.

In order to prevent possible undercrimping of a workpiece, the instant invention includes a substantially tamperproof full cycling mechanism to assure that once a crimping operation is initiated upon a given workpiece, a full cycle of operation must be completed prior to initiation of operations upon a subsequent workpiece. To this end there is provided a trigger lock member, generally designated 170, pivotally mounted as at 172 and biased in the counter-clockwise direction, as viewed in FIGURES 4 and 5, by a spring member 174. One end of the trigger lock is provided with a flanged ratchet surface 174 engageable by a tang 176 disposed on the end of the control lever 150 and the other thereof includes an extending arm portion 178. The extending arm portion is positioned to be engageable by a trigger release member 180 pivotally mounted, as at 182, upon the end of the piston rod 88. As best illustrated in FIGURE 4, the trigger release member 180 is provided with an arcuately shaped contact surface 190 sized to engage the piston stop surface and a dependent flanged trigger lock tripping surface 191 positioned to engage the extending arm portion 178 upon piston rod advance.

In operation of the described unit, pivotal displacement of the valve operator 34 about its pivotal mounting 152 in the counterclockwise direction results in inward displacement of the plunger member 130, admission of impelling fluid into the chamber 92 and in advance of the piston rod 88, as described above, and also in engagement of the tang 176 disposed at the free end thereof with the flanged ratchet surface 174 on the trigger lock member 170. The ratchet surface 174 is positioned to permit displacement of the tang 176 relative thereto in the counterclockwise direction, as indicated by the arrow 150 in FIGURE 4, but to preclude return or clockwise displacement thereof subsequent to initiation of advance. The inward displacement of the plunger member 130 results, as described above, in lineal advance of the piston rod 88 and concomitant converging advance of the crimping dies 66 toward the axis of the workpiece receiving bore 50. The advance of piston rod 88 will continue until the terminal end thereof engages the plane stop surface of the knurled knob 160 on the stop sleeve 162. Prior thereto, however, the flanged tripping surface 191 of the trigger release 180 will engage the extending arm 178 of the trigger lock 170 and will be rotataively displaced in the clockwise direction thereby with a consequent advance of the contact surface 190 in front of the end of the piston rod. Immediately prior to piston rod contact with the stop surface, however, the advanced contact surface 190 of the trigger release 188 will engage the stop surface and continuing piston rod advance will effect a rapid counterclockwise displacement of the trigger release member. The rapid counterclockwise displacement of the trigger release 180, through the engagement of the tripping surface 191 with the extending arm 178, effects a concomitant clockwise displacement of the trigger lock 170 about its pivotal mounting 172 against the action of the biasing spring 174. The pivotal displacement of the trigger lock 170 and concomitant arcuate displacement of the flanged ratchet 174 results in disengagement of the tang 176 on the end of the control lever 34 therewith and consequent permitted clockwise displacement of the control lever 34 and return of the valve plunger member 130 to its exhaust position wherein the ball 110 is again reseated on the sealing ring 112 cutting off the admittance of impelling fluid to the cylinder 92. Upon cessation of admittance of impelling fluid into the cylinder 92, the spring 94 will return the piston 90 and piston rod 88 to the position illustrated in FIGURE 4 with a consequent exhaust of impelling fluid through the exhaust plug 132. The lineal return displacement of the piston rod 88 effects a clockwise rotative displacement of the operating member 82 relative to the bore dieholder 40 and in a permitted divergent displacement of the crimping dies 66 out of the workpiece positioning bore 50 by their individual biasing sprngs 74. The lineal return displacement of the piston rod 88 also effects a disengagement of the trigger release 180 from the trigger lock 170 and permits the biasing spring 174 of the latter to return it to its latching position, as shown in FIGURE 4, for the next operational cycle.

By the above described structure for a full cycling mechanism it will be seen that irrespective of whether the valve operator 34 is depressed a great or small amount, any displacement thereof sufficient to effect admission of impelling fluid into the shoulder 92 will result in locking engagement of the tang 176 with the ratchet 174. Such engagement effectively precludes any return displacement of the valve operator 34 until the piston rod 88 reaches its limit of lineal advance, i.e., by engagement with the stop surface 160. Thus the above described structure insures that once a cycle of operation has been initiated, a full cycle of operation must be completed prior to the initiating of a succeeding cycle upon a subsequent workpiece. Such structure effectively precludes an operator from undercrimping a workpiece by momentary actuation of the valve operator 34.

As will be apparent to those skilled in the art, the hereinabove described structure is one that fully satisfies the hereinbefore stated objects and advantages of the invention.

Having thus described my invention, I claim:

1. In a power operated tool for crimping a workpiece, a crimping mechanism including crimping dies and a rotatably displaceable operating member for effecting crimping die advance in accordance with the degree of rotative displacement thereof, a cylinder, a lineally displaceable piston rod mounted in said cylinder and connected to said operating member to rotatably displace said operating member in accordance with the degree of lineal piston rod advance, an adjustably positionable stop member positioned in the path of piston rod advance to limit the degree of advance thereof by engagement therewith, a valve assembly for controlling the admittance of impelling fluid into said cylinder to effect advance of said piston rod member, a pivotally displaceable control lever for controlling actuation of said valve assembly, pivotally mounted retention means engageable with said control lever to prevent return displacement thereof subsequent to initiation of valve assembly opening and trigger means pivotally mounted on said piston rod and displaceable in response to engagement with said stop member for selectively disengaging said retention means from said control lever to permit deactuation of said cylinder substantially simultaneous with the cessation of piston rod advance.

2. The structure as set forth in claim 1 wherein said crimping mechanism includes a bored die holder, a plurality of radially disposed crimping dies reciprocably mounted in said dieholder and lineally displaceable in response to rotative displacement of said operating member.

3. A power operated tool for crimping a workpiece comprising a bored dieholder, a plurality of radially disposed crimping dies reciprocably mounted in said dieholder for crimping a workpiece insertable therein, a power cylinder, a lineally displaceable piston rod mounted in said cylinder and normally biased in the retracted position, adjustably positionable stop means disposed in the path of advance of said piston rod for selectively controlling the amount of advance of said piston rod short of a limiting value therefor, a rotatably displaceable operating member for effecting crimping die advance in amounts responsive to the degree of lineal advance of said piston rod, valve means openly displaceable to admit impelling fluid to said cylinder to effect piston rod advance, a pivotally displaceable valve operator for actuating said valve means, retention means engageable with said valve operator to prevent return displacement thereof subsequent to initiation of valve means opening displacement and trigger means mounted on said piston rod and displaceably engageable by said stop means for disengaging said retention means from said valve operator to permit deactuation of said cylinder substantially simultaneous with the cessation of piston rod advance to prevent undercrimping of a workpiece.

4. A power operated crimping tool comprising:
   (a) a lineally displaceable piston rod,
   (b) power means for lineally displacing said rod,
   (c) a crimping mechanism including crimping dies and means for advancing said dies in amounts responsive to the degree of lineal displacement of said piston rod,
   (d) adjustable means for selectively controlling the limit of displacement of said piston rod short of its maximum displacement to thereby control the depth of crimp,
   (e) control means for actuating said power means thereby displacing said piston rod,
   (f) full cycling means for precluding return displacement of said piston rod subsequent to initiation of the displacement thereof, and
   (g) trigger means responsive to the cessation of said piston rod displacement for releasing said full cycling means.

References Cited in the file of this patent

UNITED STATES PATENTS

| | | |
|---|---|---|
| 1,894,293 | Green | Jan. 17, 1933 |
| 2,467,012 | Deuschle | Apr. 12, 1949 |
| 2,620,876 | Harness et al. | Dec. 9, 1952 |
| 2,649,076 | Dupre | Aug. 18, 1953 |
| 2,714,827 | Kusiv et al. | Aug. 9, 1955 |
| 2,962,074 | Dupre et al. | Nov. 29, 1960 |